(No Model.)
A. R. EARL.
TRUNK.
No. 296,395. Patented Apr. 8, 1884.
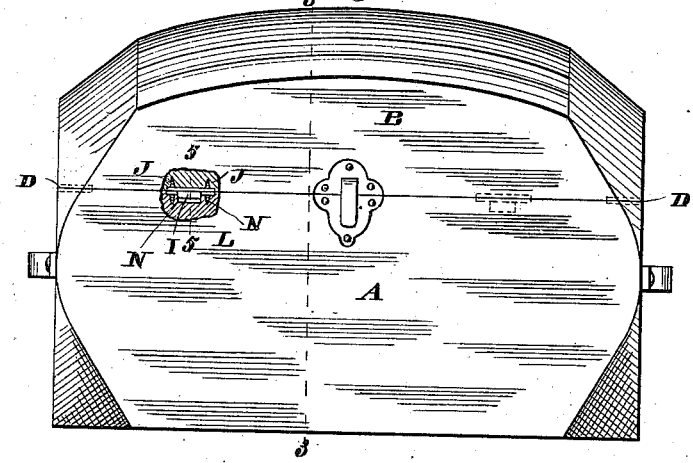
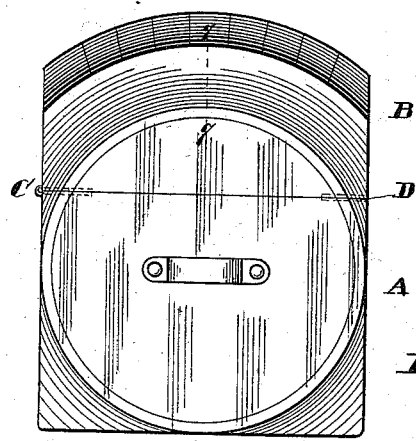
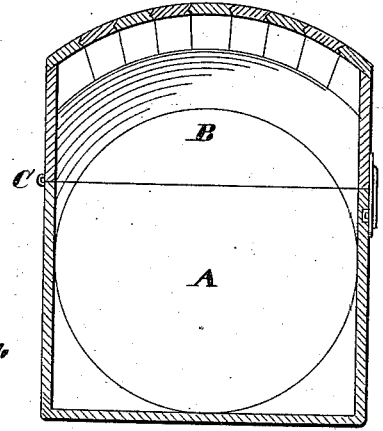
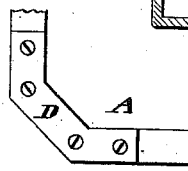
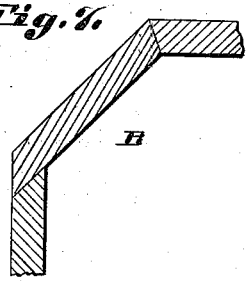
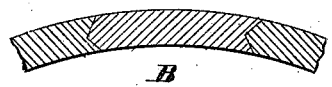
Attest:
Charles Pickles
Geo. L. Wheelock
Inventor:
Abel R. Earl
By Knight Bros
Attys

UNITED STATES PATENT OFFICE.

ABEL R. EARL, OF ST. LOUIS, MISSOURI.

TRUNK.

SPECIFICATION forming part of Letters Patent No. 296,395, dated April 8, 1884.

Application filed January 9, 1884. (No model.)

*To all whom it may concern:*

Be it known that I, ABEL R. EARL, of the city of St. Louis, in the State of Missouri, have invented a certain new and useful Improvement in Trunks, of which the following is a full, clear, and exact description, reference being had to the accompanying drawings, forming part of this specification, and in which—

Figure 1 is a front view of my improved trunk. Fig. 2 is an end view. Fig. 3 is a transverse section taken on line 3 3, Fig. 1. Figs. 4, 5, 6, and 7 are enlarged detail views, illustrating the manner of construction of the trunk, Fig. 5 being a section taken on line 5 5, Fig. 1, and Fig. 7 being a section taken on line 7 7, Fig. 2.

My invention relates, first, to the construction of the top of the trunk; and, secondly, to the rounded corners of the top.

My improvement consists in the construction hereinafter described, and pointed out in the claims.

Referring to the drawings, A represents the body, and B the lid or top, of a trunk having rounded corners or circular ends. The body and lid or top may be of any desired shape in transverse section. I have shown a common rectangular body (see Fig. 3) and a dome-shaped top; but the body may be of any other non-circular form, and the lid may be flat instead of dome-shaped, if desired. They are hinged together, as usual, at C. Either one or both ends, preferably both, as shown, (and I will describe it as both,) are made perfectly round or circular, as shown in Figs. 1 and 2, so that by raising one end the trunk may be rolled over and over without the slightest jarring or damage to the trunk, as there are no corners to come in contact with the floor.

In constructing the trunk I connect the horizontal and vertical parts by inclined pieces, (see Fig. 7,) which form the round end. The top I make of strips connected by suitable V-joints. (See Fig. 6.) Any incline may be given to the joints, and by having the strips all prepared beforehand a lid can be very quickly, neatly, and strongly produced. By simply putting the joints together in the middle of the lid the ends of the strips can be bent into shape without further attention being paid to the joints, for they will naturally come together and will prevent the strips from slipping and getting out of shape. I prefer to secure plates D to the upper corners of the body and the lower corners of the lid, (see Fig. 4;) and I also prefer to provide the front edge of the lid with projections I, secured to the lid by screws J, which enter sockets L, formed in plates secured to the upper front edge of the body by screws N. (See Figs. 1 and 5.) The projections fitting in the sockets when the lid is closed adds strength to the parts.

The invention is adapted to other round and curved articles.

I claim as my invention—

1. A trunk the top of which is made of strips connected by V-joints, substantially as shown and described.

2. A trunk the top of which is made of strips connected by V-joints and provided with round corners, as set forth.

ABEL R. EARL.

In presence of—
   GEO. H. KNIGHT,
   SAML. KNIGHT.